UNITED STATES PATENT OFFICE.

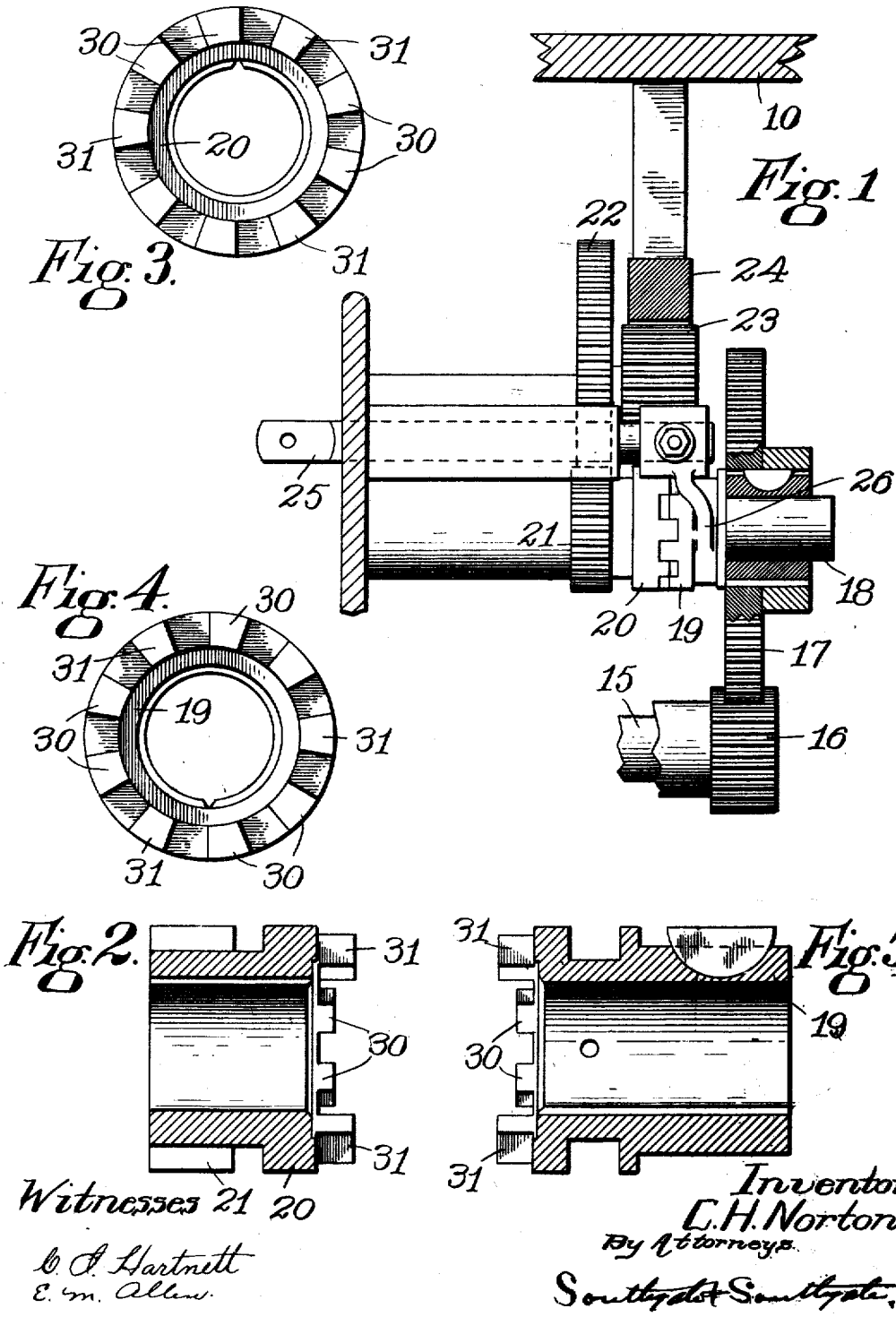

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

CLUTCH.

1,009,990.  Specification of Letters Patent.  Patented Nov. 28, 1911.

Original application filed June 19, 1909, Serial No. 503,155. Divided and this application filed July 21, 1911. Serial No. 639,703.

*To all whom it may concern:*

Be it known that I, CHARLES H. NORTON, a citizen of the United States, residing at Worcester, in the county of Worcester and State of Massachusetts, have invented a new and useful Clutch, of which the following is a specification.

This is a division of my application for patent on a table stop clutch, Serial No. 503,155, filed June 19, 1909, Patent No. 1,010,303, patented Nov. 28, 1911, and relates to the clutch shown therein.

The principal objects of the invention are to provide a simple clutch capable of being set in two ways so that upon the reversal of the rotary part to which one clutch section is connected the other section can be caused to rotate either with or without a dwell. It is capable of general use.

Further objects and advantages of the invention will appear hereinafter.

Reference is to be had to the accompanying drawing in which—

Figure 1 is a transverse sectional view of a portion of a machine showing a preferred embodiment of this invention applied thereto; Fig. 2 is a longitudinal central sectional view of a clutch member constituting a part of the invention; Fig. 3 is a face view thereof; Fig. 4 is a corresponding face view of the opposite clutch member, and Fig. 5 is a central longitudinal sectional view of the second clutch member.

This invention is illustrated as applied to a machine the construction of which is not shown, which involves a reciprocating table 10, reciprocated by means of a shaft 15 which has a reversing rotary motion in one direction and then in the other. On this shaft is a gear or pinion 16 which operates a gear 17 loose on the shaft 18. Mounted to rotate with this gear is a clutch member 19 adapted to be connected with a companion clutch member 20 which is fixed to a gear 21. This gear operates a gear 22 and a gear 23 which latter operates a rack 24 on the table 10. The gear 17 and clutch member 19 are capable of moving back and forth on the shaft 18, the gear meantime always remaining in mesh with the pinion 16. For causing this movement a reciprocating rod 25 is shown having an arm 26 thereon which directly reciprocates the gear and clutch member. This rod is operated in any desired way. It will be obvious that when this rod is in the position shown in Fig. 1 the clutch members are together and the table will be reciprocated regularly in accordance with the situation of the dogs or other controlling devices (not shown) but when the rod is pushed to the right the clutch members will be apart and although the gear 17 will rotate continuously first in one direction and then in the other yet the table will be stopped.

Each of the clutch members is provided with means whereby when they are set in a certain way the reversal of motion of the driving shaft 15 will be transmitted to the table only after a certain period has elapsed, so that there will be a dwell of the table upon reversal. Thus it may be considered as a convertible-position or lost-motion clutch. For this purpose each of the clutch members is provided with a plurality of teeth 30 in the ordinary way. These teeth are spaced equally apart around the circumference of the clutch members and are equally spaced also with an additional series of teeth 31. These latter teeth occupy the same position as would be occupied by some of the teeth 30, but they are fewer in number so that they are spaced a greater distance apart than the teeth 30 are. They differ from the teeth 30 only in being longer so that they project out toward the other clutch member and are adapted to engage it before the teeth 30 can do so, when the two clutch members are moved toward each other.

When the two clutch members are in the position shown in Fig. 1 the table is driven without dwell, the long teeth 31 on each clutch member meshing between two of the teeth on the other member, so that the table is driven positively back and forth in accordance with the operation of the shaft 15. If it is desired, however, to cause the above mentioned dwell at the end of the stroke the clutch members are moved apart so that the long teeth 31 of each one do not engage the teeth 30 of the other, but only engage the long teeth 31 thereof. Now it will be seen that each tooth 31 of the driving member is in engagement with the corresponding long tooth 31 of the driven member, and that upon reversal the driving member will have to turn through the space between two of the teeth 31 on the driven member before it can pick the latter up and carry it in the reverse direction. Thus the table has the usual dwell. The length of this dwell will of course be controlled by the space between the long teeth 31, consequently by the number of these teeth on the clutch members. In the present instance three of them are shown on each clutch member.

It will be understood, of course, that the clutch can be operated by hand to secure the desired result.

While I have illustrated and described a preferred embodiment of the invention I am aware that many modifications can be made therein by any person skilled in the art without departing from the scope of the invention as expressed in the claims. Therefore, I do not wish to be limited to all the details of construction herein shown and described, but What I do claim is:—

1. In a device of the character described, the combination of a driving clutch member and a driven clutch member, each of said members having two sets of teeth thereon, the teeth of one set being shorter than those of the other and the longer teeth being separated from each other by a space greater than the space between the shorter teeth, whereby when the longer teeth only are in engagement and the driving member is reversed the backward motion will be transmitted to the driven member only after the driving member has completed a part of a revolution.

2. In a device of the character described, the combination of a driving clutch member and a driven clutch member, each having two sets of teeth thereon all the teeth being equally spaced apart, but the teeth of one set projecting beyond the remaining teeth and located at regular intervals at a distance apart greater than the space between two of the other teeth.

3. As an article of manufacture, a clutch comprising two members, each having a set of teeth thereon adapted to mesh with each other and certain of said teeth intermediate between the remainder of the teeth projecting beyond the other teeth.

4. As an article of manufacture, a clutch having two members, one of said members being provided with teeth spaced equally apart, and the other having teeth spaced equally apart, some of which extend beyond the others, said extending teeth being located farther apart than the width of the space between two of the other adjacent teeth.

In testimony whereof I have hereunto set my hand, in the presence of two subscribing witnesses.

CHARLES H. NORTON.

Witnesses:
    FREDK. C. BUTTERFIELD,
    J. HERBERT JOHNSON.